US 6,748,668 B2
Jun. 15, 2004

(54) VARIABLE TREAD AND RISE ROUTER TEMPLATE FOR STAIRS STRINGER

(75) Inventor: Randall Huff, 1350 Merry Rd., Waterford, MI (US) 48328

(73) Assignee: Randall Huff, Waterford, MI (US)

( * ) Notice: Subject to any disclaimer, the term of this patent is extended or adjusted under 35 U.S.C. 154(b) by 0 days.

(21) Appl. No.: 10/241,714

(22) Filed: Sep. 12, 2002

(65) Prior Publication Data

US 2004/0049934 A1 Mar. 18, 2004

(51) Int. Cl.[7] ................................................. G01B 3/14
(52) U.S. Cl. ............................................. 33/562; 33/42
(58) Field of Search ................................ 33/32.1, 32.2, 33/41.1, 42, 197, 430, 526, 562; 144/144.51, 145.1

(56) References Cited

U.S. PATENT DOCUMENTS

| 374,493 A | 12/1887 | Parry |
| 909,636 A | * 1/1909 | Montgomery ........... 144/144.51 |
| 1,042,120 A | 10/1912 | Kelley |
| 1,552,881 A | 9/1925 | Rose |
| 4,605,048 A | 8/1986 | Swartout et al. |
| 4,769,920 A | * 9/1988 | O'Connor, Jr. ............... 33/562 |
| 6,233,835 B1 | * 5/2001 | Brown et al. ................. 33/41.1 |

* cited by examiner

*Primary Examiner*—G. Bradley Bennett

(57) ABSTRACT

A variable tread and rise router template for cutting mortises in stair stringers to receive stair treads and risers which is generally triangular in shape having truncated corners and planar in configuration and a tread slot and a riser slot joining the tread slot at a right angle. The template body cuts complementary stringers, routing a first stringer, flipping the generally planar body from one working surface to its opposite working surface, and routing the other stringer. The template body has registration points slidably mounted within the template body to extend downward from the planar body when working from either working surface and a clamp assembly, each positioned to correspond with a corner portion of the template body. The registration assemblies are adjustable to determine tread and riser. The clamp assembly may be released and tightened at another desired stringer position to make the next mortise.

18 Claims, 9 Drawing Sheets

VARIABLE TREAD AND RISE ROUTER TEMPLATE FOR STAIRS STRINGER

BACKGROUND OF THE INVENTION

1. Field of the Invention

The present invention relates to carpentry. More particularly, the present invention relates to templates for routing stair stringers.

2. Description of the Related Art

The routing of stair stringers to receive stair treads and risers is widely used in custom carpentry for the installation of attractive stairways. Router template systems are known which provide for variation in riser height and tread depth, but are difficult to adjust and use. A simpler device is known which is relative easy to use and adjust for riser height and is reversible so as to rout opposing stair stringers without readjustment of the template, but is limited to a single tread depth. It would be desirable to provide a router template system which is portable, easy to adjust and allows for adjustment of both riser height and tread depth as well as tread thickness and is reversible to rout opposing stair stringers without additional adjustment.

U.S. Pat. No. 374,493, issued Dec. 6, 1887, to Parry, describes a template for gaining stair stringers using a molding tool.

U.S. Pat. No. 1,042,120, issued Oct. 22, 1912, to Kelley describes a template or guide device for use with routing machines to cut stair stringers.

U.S. Pat. No. 1,552,881, issued Sep. 8, 1925, to Rose describes a spindle molding machine for cutting grooves in stair stringers.

U.S. Pat. No. 4,605,048, issued Aug. 12, 1986, to Swartout et al., describes a reversible template for routing facing stair stringers without readjustment, however, the template is limited to a single stair tread depth.

None of the above inventions and patents, taken either singularly or in combination, is seen to describe the instant invention as claimed. Thus a variable thread and rise stringer for stairs solving the aforementioned problems is desired.

SUMMARY OF THE INVENTION

The present invention is a router template for cutting mortises in stair stringers to receive stair treads and risers. The invention is generally triangular in shape and planar in configuration. The template defines a tread slot and a riser slot joining the tread slot at a right angle. The template body is useful for cutting complementary stringers routing a first stringer, flipping the generally planar body from one working surface to its opposite working surface, and routing the other stringer.

The template body has registration points slidably mounted within the template body to extend downward from the planar body when working from either working surface. The template has a tread registration assembly and a riser registration assembly and a clamp assembly, each positioned to correspond with the corner portions of the template body. The tread registration assembly is adjustable and determines tread length, and the riser registration assembly is adjustable and determines riser length. Each registration assembly is placed on the same edge of the riser and the clamp assembly clamps against the opposite edge of the riser to maintain the template in the desired position to rout a tread and riser. The clamp assembly is releasable for sliding the template body along the stringer and tightened at the desired position to make the next mortise.

The tread slot has scales to determine the length of the tread mortice and the thickness of the mortice to accommodate differing lengths and thicknesses of tread. The tread registration assembly is then set by moving it against the string edge and securing it once the tread slot scale determines the tread configuration. The riser slot has a scale to determine the length of the riser. The riser registration assembly is then set by moving it against the stringer edge and securing it in the manner of the tread registration assembly. Once set, the registration remains set during the routing of both complementary stringers. A router collar is selected which travels against the inner wall of the tread slot to cut the desired tread thickness. The body is preferably made of high density polyethylene(HDPE).

Slot inserts are provided for the tread slot for providing desired tread lip design and to provide a parallel slot for open tread routing and an angled slot for closed tread routing for use with a riser.

Accordingly, it is a principal object of the invention to provide a router template for routing stair stringers which is portable and easily used on the construction site.

It is another object of the invention to provide a router template as above which, once adjusted, is reversible so as cut complementary mortises for stair treads and risers in facing risers.

It is a further object of the invention to provide a router template as above which is adjustable to provide variation in both rise height and tread depth.

Still another object of the invention is to provide a router template as above which is adaptable to cut mortises for open stair stringers.

Yet another object of the invention is to provide a router as above which provides for cutting mortises for custom tread edges.

Still another object of the invention is to provide a router template as above with which cuts stringer mortises to fit a range of stair tread thicknesses.

Yet another object of the invention is to provide a router template as above which may easily be moved and positioned to cut a series of open or closed stair stringer mortises.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a router template for cutting mortises in stair stringers to receive stair treads and risers. The invention is generally triangular in, shape having truncated corners and is planar in configuration. The template defines a tread slot and a riser slot joining the tread slot at a right angle. The template body is useful for cutting complementary stringers routing a first stringer, flipping the generally planar body from one working surface to its opposite working surface, and routing the other stringer.

The template body has registration points slidably mounted within the template body to extend downward from the planar body when working from either working surface. The template has a tread registration assembly and a riser registration assembly and a clamp assembly, each positioned to correspond with the corner portions of the template body. The run registration assembly is adjustable and determines run length, and the run registration assembly is adjustable and determines run length. Each registration assembly is placed on the same edge of the riser and the clamp assembly clamps against the opposite edge of the riser to maintain the template in the desired position to rout a tread and riser. The clamp assembly is releasable for sliding the template body along the stringer and tightened at the desired position to make the next mortise.

Figure 1:
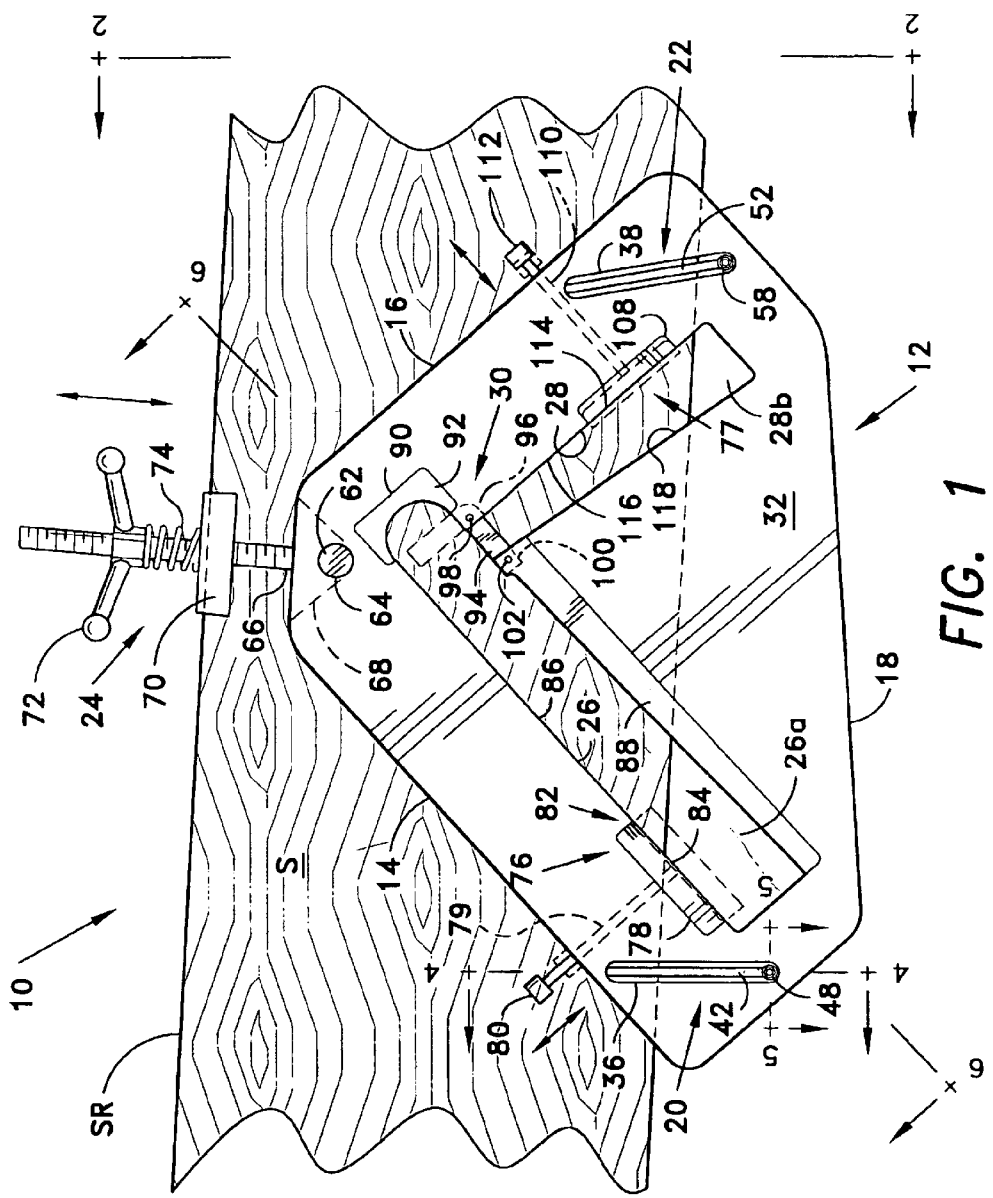
FIG. 1 is an environmental, perspective view of a variable tread and rise router template for stair stringers according to the present invention arranged for a closed stair cut.
Figure 2:
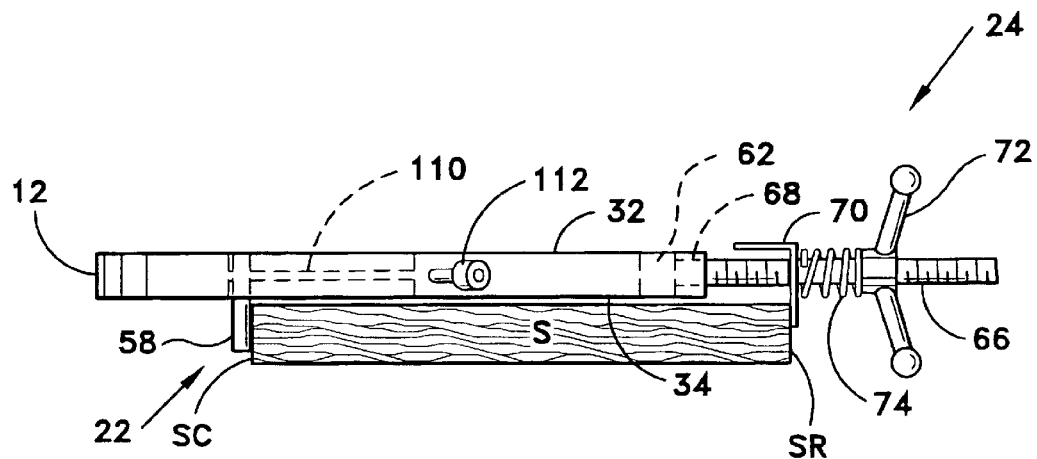
FIG. 2 is a section view drawn along lines 2—2 of FIG. 1.

Referring to the figures, FIG. 1 shows an environmental plan view of one embodiment of the stringer routing template of the present invention. The adjustable riser and stair template assembly 10 has a generally triangular, planar body 12 having truncated corners defined by a tread side 14, a riser side 16 and base side 18. Tread registration assembly 20 is located in body 12 near the corner formed by tread side 14 and base side 18. Riser registration assembly 22 is located in body 12 near the corner formed by riser side 16 and base side 18. Clamp assembly 24 is located at the corner formed by tread side 14 and riser side 16. Tread slot 26 is generally parallel to tread side 14 and spaced inward therefrom and extends through body 12, serving as the routing guide for forming a tread mortise in stringer S. Riser slot 28 is generally parallel to riser side 14 and spaced inward therefrom and extends through body 12, serving as the routing guide for forming a riser mortise in stringer S. Riser slot 28 meets and opens into tread slot 26 perpendicularly at slot junction 30. Tread slot and riser slot 26 extend through the body 12 from body face 32 to body opposing face 34.

Run registration slot 36 extends through body 12 and serves as a mounting and guide for run registration assembly 20. Run registration slot 38 extends through body 12 generally parallel to run registration slot 36, and serves as a mounting and guide for rise registration assembly 22. Run registration assembly 20 (see FIG. 5) includes run registration bar 42 extending along the length of and bisecting run registration slot 36. Run registration assembly 20 has a tubular registration member 48 which, once set slides downward to form a registration point against stringer cut edge SC.

Rise registration assembly 22 is identical in configuration to run registration assembly 20 and has a tubular registration member 48 which, once set, slide downward to form another registration point against stringer cut edge SC. When template body 12 is flipped over for routing a complimentary riser, tubular registration members 48 and 58 are free to slide downward in place to act as registration points without resetting their position along registration bars 42 and 52, respectively.

Clamp assembly 24 serves to securely clamp template assembly 10 to stringer S for carrying out a routing step. Clamping assembly 24 includes a pivot socket 62 located within pivot socket bore 64 extending through template body 12 spaced inward from the truncated corner formed by tread side 16 and riser side 18. Pivot socket 62 defines a transverse threaded bore at its midpoint for receiving an inner end of threaded post 66. Pivot socket 62 is free to pivot within pivot socket bore 64 so as to allow threaded post 66 to rotate transversely within "V"-slot 68 cut within the truncated corner of template body 12 and extending over about 90 degrees.

An angle bracket 70 having two perpendicular walls is fit over post 66 through a bore in one wall of the bracket at the midpoint thereof, the other wall being positioned so as to engage the stringer rail edge SR. Wing nut 72 is located on post 66 so as to exact pressure on clamping spring 74 when turned. Clamping spring 74 in turn exacts pressure on angle bracket 70 so as to provide clamping pressure against stringer rail edge SR to secure the template body 12 for routing.

Run scale assembly 76 is located on template body 12, preferably in the vicinity of the end of tread slot 26 which is remote from slot junction 30. Rise scale assembly 77 is located on template body 12, preferably in the vicinity of the rise slot 26 which is remote from slot junction 77. Run scale assembly 76 includes a generally rectangular run scale head 78, a run scale shaft 79, and a run scale plunger 80, the run scale head 78 having upper and lower planar surfaces corresponding to body face 32 and body opposing face 34, an inner face opening into tread slot 26 and opposing ends.

Run scale head 78 has a tread graduated thickness scale 82 marked on at least one planar surface thereof and extending from the inner face along an end thereof. The inner face of run scale head 78 has a run graduated length scale 84 extending therealong so as to indicate the run length to be cut as measured from slot face 28. Tread slot 26 has an outer side 86 nearest to and parallel to tread side 14 and a tread slot angle insert 98 opposite outer side 86 and sloping inward from slot junction 30 to the remote end thereof. Run scale head 78 is attached at its midpoint to run scale shaft 79 extending perpendicularly outwards from tread slot outer side 86. Run scale shaft 86 extends through a corresponding lateral bore within template body 12 to an exposed end and has run scale plunger 80 slidingly engaged and adjustably securable therewith by means of a set screw(not shown).

Tread scale plunger 80 may be secured at any exposed point along shaft 79 its spacing body tread side 14 being determined when calibrating the template for a desired run and thickness. By manipulating plunger 80, head 78 may be moved back and forth within an identically configured recess in body 12 along tread slot outer side between an outer position with the head inner face flush with slot outer side 86 and an inner position with the inner face extended into tread slot 26 a predetermined distance as measured by tread thickness scale 82.

Rise scale assembly 77 is similar in structure to run scale assembly 76 and similarly mounted within template body 12, having generally rectangular rise scale head 108 attached to rise scale shaft 110 upon which is mounted rise scale plunger 112. A rise length scale 114 measured from slot junction 30 is located along the inner face of rise scale head 108. Plunger 112 is set on shaft 110 such that head 108 is movable within a recess in body 12 between outer position with its inner surface flush with riser slot outer wall 116 and a point ⅛ of an inch within riser slot 28. Riser slot inner wall 118 slopes inward from slot junction 30 to the extreme end thereof.

In the closed stair configuration of FIG. 1, the inner sides of tread slot 26 and riser slot 28 are angled in the closed stair configuration so as to provide mortises shaped for final adjustment and shimming of the tread and riser during their installation.

Template body 12 defines a tread slot outer end 90 extending beyond riser slot 28 which is generally rectangular in shape and slightly wider than slot 28 which is configured to hold interchangeable inserts by frictional engagement. In the closed stair configuration of FIG. 1, it is normal practice to provide a rounded tread open end. This is accomplished by using a rounded insert 92 placed in outer end 90 for routing.

A riser block arm 94 is pivotally mounted on the outer side of riser slot 28 at its junction with tread slot 26. The riser block arm 94 is preferably mounted within a transverse slot 96 in body 12 and is held for rotation at a pivoting end by the inner ends of opposed set screws 98 and may be secured in desired position by tightening set screws 98. When riser block arm 94 is in the closed position, its remote end rests within riser block arm receiving slot 100 located opposite transverse pivot slot 96 so as to receive riser block arm 94, thus blocking off riser slot 28 from tread slot 26, the riser block arm upper side providing a continuous guide for carrying out the routing of the stair stringer tread mortise. Riser block arm 94 may be secured in this position by tightening riser block receiving set screws 102 against the arm 94. (This is particularly desirable when routing open stair stringers as see FIG. 3.)

When routing the riser stringer mortise, riser block arm 94 is rotated upward(see phantom lines) to block off tread slot end 90 and provide a smooth cut corner between riser slot outer wall 118 and tread slot 26. The rotating end of blocking arm 94 and the transverse slot 96 are so shaped as to only allow blocking arm 94 to rotate to a point where the lower edge of arm becomes an in-line extension of riser slot outer wall 116. The arm may be secured in this position by pivot set screws 98.

Figure 3:
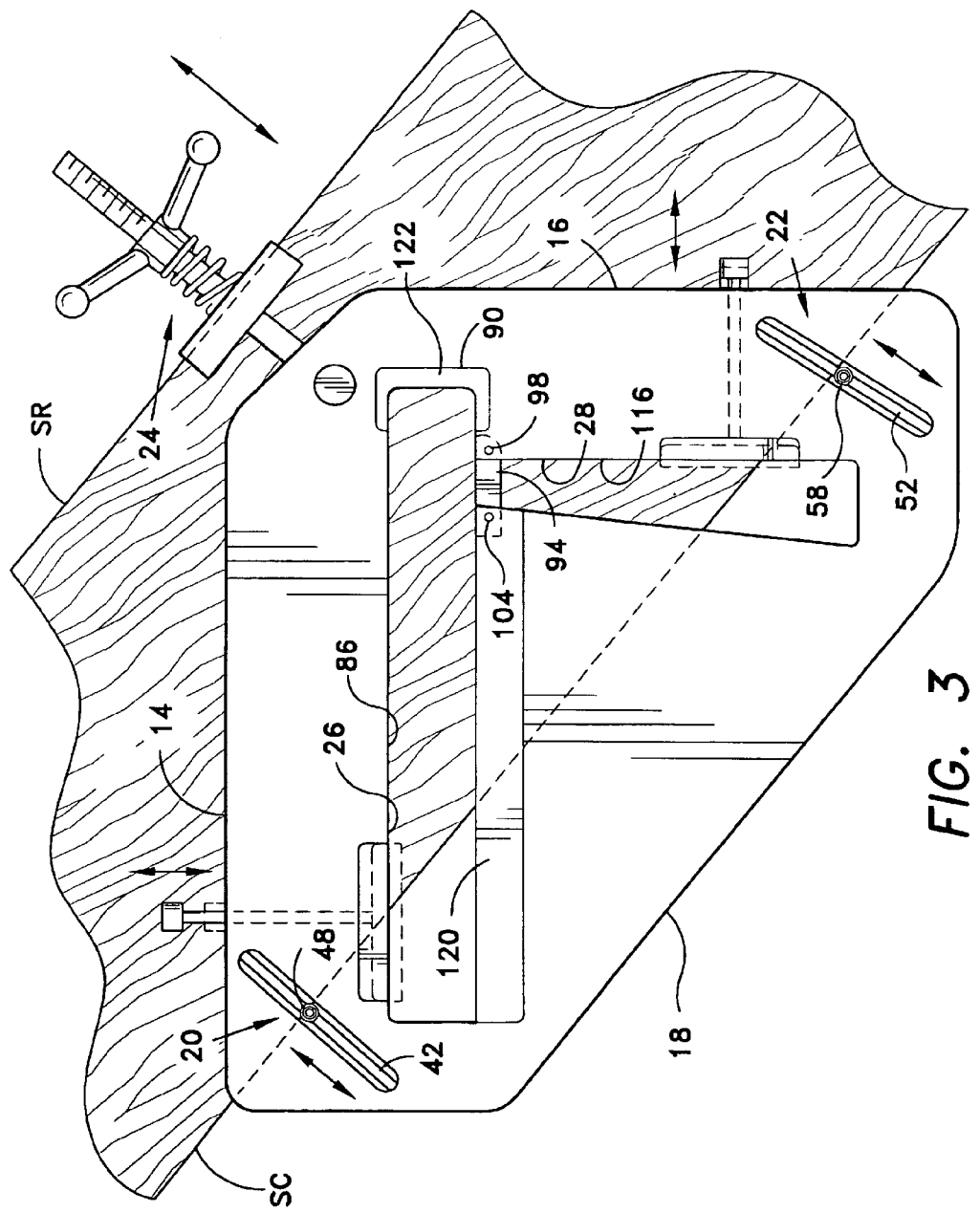
FIG. 3 is an environmental plan view of another embodiment of the stringer routing template of the present invention arranged for an open stair cut.

Referring to FIG. 3, there is shown the inventive stair router template in a configuration for routing stringers for an open stair(treads only). This embodiment is identical to that of FIG. 1 with the exception that tread groove parallel insert 120 replaces the tread slot angle insert 88 and butt tread slot insert 122 replaces rounded tread slot insert 92. It is noted that riser block arm 94 is locked in the closed position since no riser mortise is routed. Tread registration tubular member 48 along with the cylindrical body has been moved along tread registration bar 42 to a point against stringer cutting edge SC and locked by set screws, and riser registration tubular member 58 along with the cylindrical body has been moved along riser registration bar 52 to a point against stringer cutting edge SC and locked by set screws. The template of FIG. 3 is thus ready for the routing step. The registration assemblies of the template in FIG. 1 are positioned and locked in the same manner when prepared for the routing step.

Figure 5:
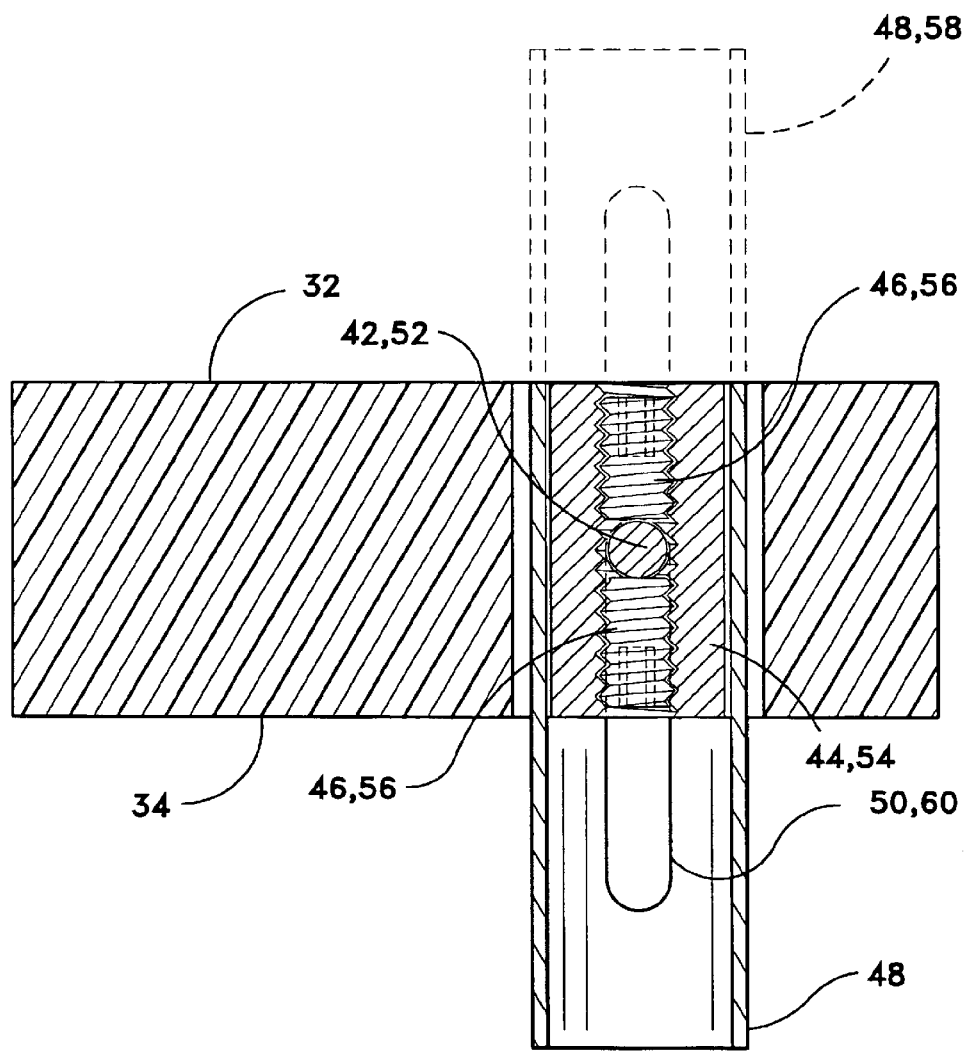
FIG. 5 is a section view of the template and stringer along the line 5—5 of FIG. 1.
Figure 6:
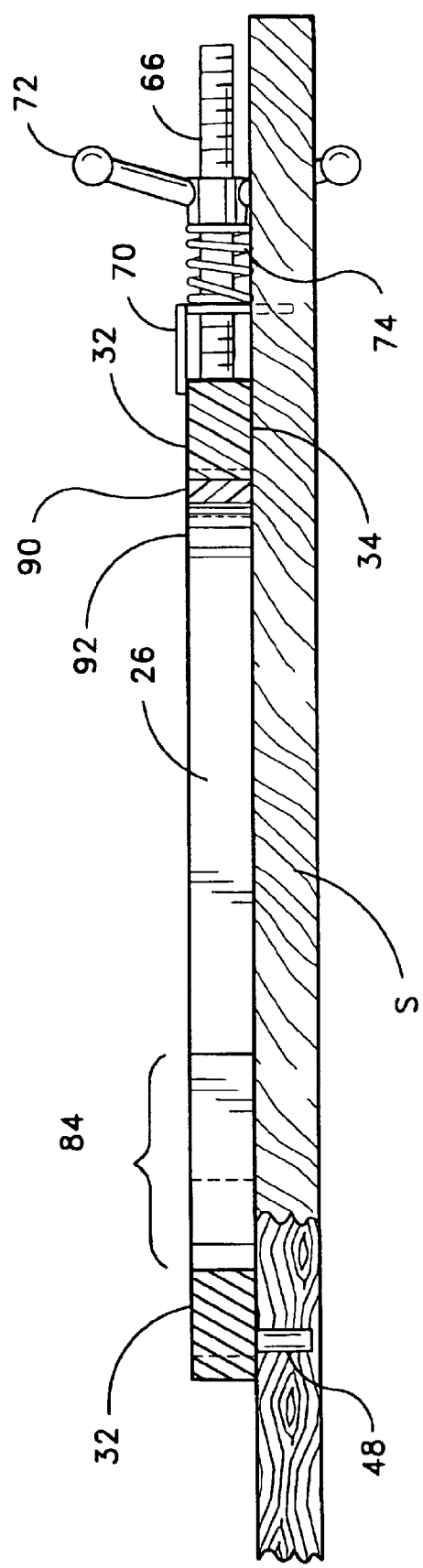
FIG. 6 is a section view of the template and stringer along the line 6—6 of FIG. 1.

Referring to FIG. 5, a sectional view of the internal structure of the tread registration assembly 20 is shown. Riser registration assembly 22 is identical in detail and are thus described together as follows. Registration bar 42,52 is centrally located along registration slot 38,58 and positioned midway between body face 32 and body opposite face 34. Registration cylindrical body 44,54 extends between template body face 32 and face 34 and remains in this position relative thereto while remaining free toe along bar 42,52 until it is locked in position by tread registration body set screws 46,56. Registration tubular member 48,58 is slidably fit over cylindrical body 44,54. Registration tubular member 48,58 has opposed slots 50,60 therein to allow it to slide along registration bar 42,52 and to move up and down relative to bar 42,53 within the bounds of slots 50,60. The registration tubular member assumes the position shown when body face 32 is positioned as the upper face of template body 12. The registration tubular member is free to assume the position shown in phantom lines when the template body is flipped over for routing a complimentary stringer. This allows the registration tubular member to act as a registration point for routing the complimentary stringer without resetting its position along registration bar 42,52.

Figure 4:
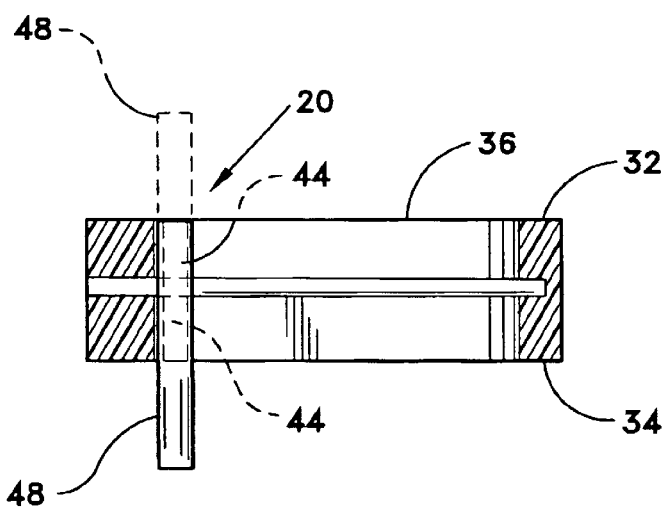
FIG. 4 is a section view of the template and stringer along line 4—4 of FIG. 1.

In operation, for the routing of a closed stair stringer the configuration of FIG. 1 is employed. The desired tread length and riser height is determined by traditional methods. The template body 12 is positioned covering a horizontally disposed stringer S as in FIG. 1, with the clamp assembly 24 partially overhanging the stringer rail edge SR of stringer S and each of the tread registration assembly 20 and the riser registration assembly partially overhanging the stringer cut edge SC such that tread registration tubular members 48 are spaced away from the riser R and free to fall into their registration position(see FIGS. 3 and 4). Wing nut 72 may be turned on threaded post 66 so as to travel outward to allow for the width of the stringer as required.

Figure 7A:
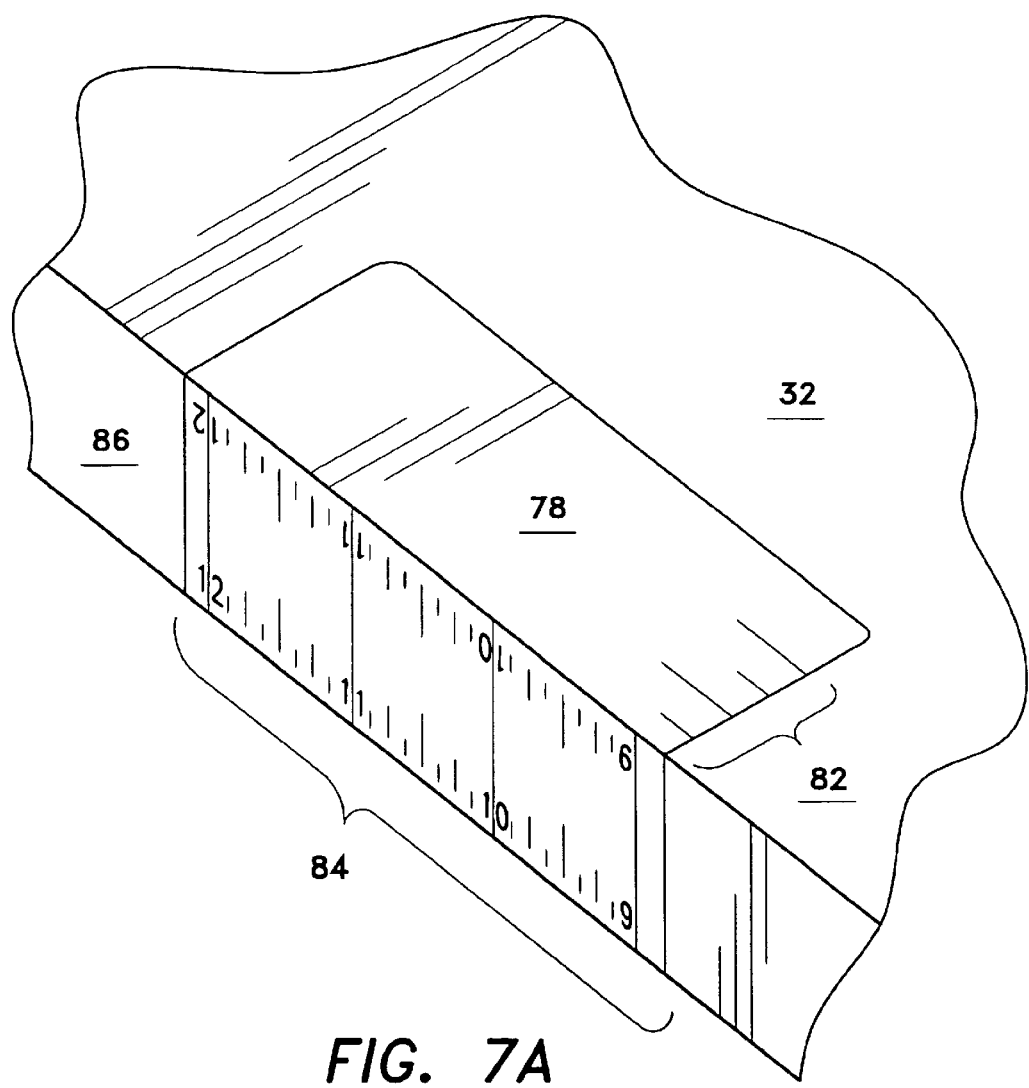
FIG. 7A is a detail perspective view of the run scale head of FIG. 1 with the head in the retracted position.
Figure 7B:
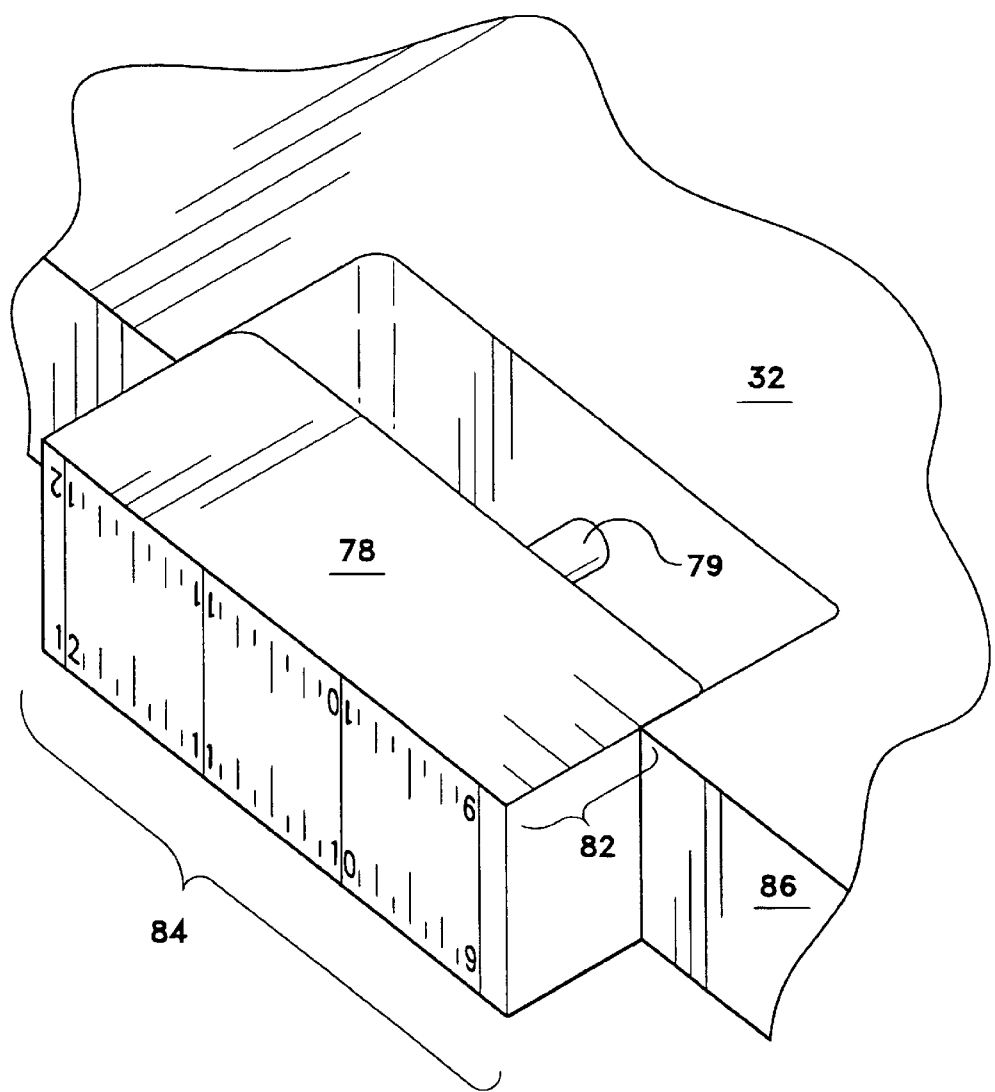
FIG. 7B is a detail perspective view of run scale head of FIG. 1 with the head in an extended position.
Figure 8A:
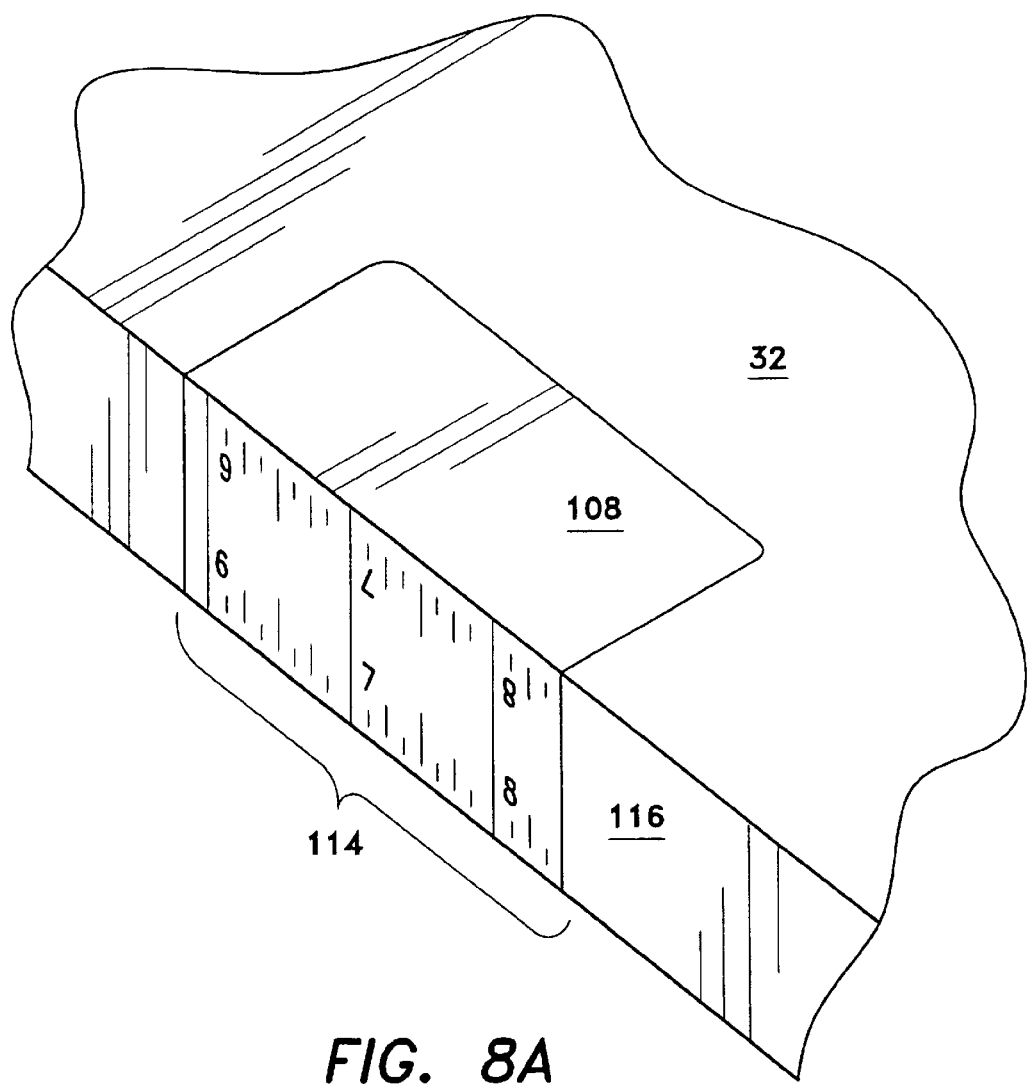
FIG. 8A is a detail perspective view of the rise scale head of FIG. 1 with the head in the retracted position.
Figure 8B:
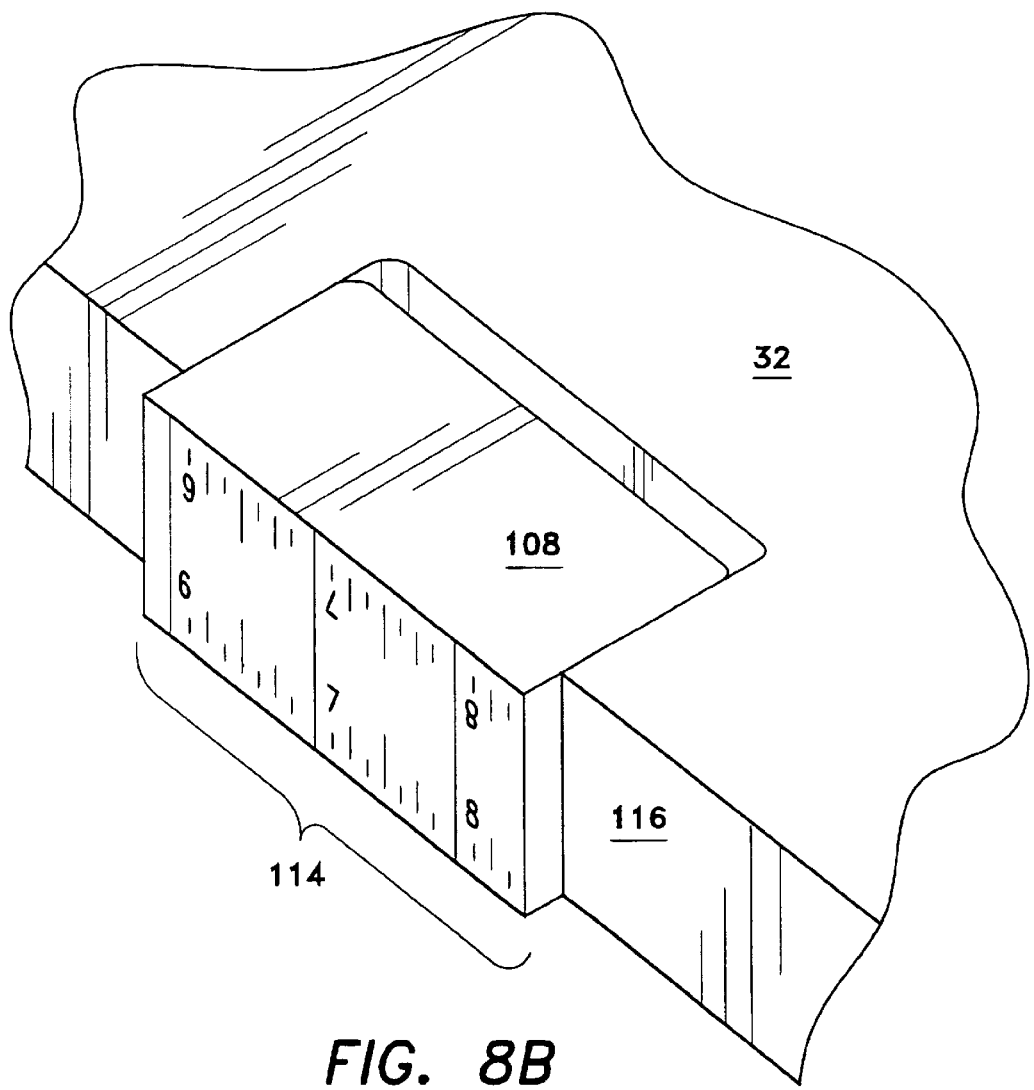
FIG. 8B is a detail perspective view of the rise scale head of FIG. 1 with the head in an extended position.

Angle bracket 70 is manipulated to fit over the upper corner of stringer rail edge SR. Tread scale plunger is adjusted from its retracted position as shown in FIG. 7A inward to obtain a mortise sized to receive the desired thickness of tread. In normal practice, a ½ inch diameter router bit is used with a ¾ inch concentric collar. The collar is held in place by the router guide and the collar is moved against the inner walls of the template slots. The template is preferably of about the same thickness as the length of the router collar. The tread scale head has a tread thickness scale on its upper side marked in ⅛ inch increments.

The tread scale head is adjusted by pushing the tread scale plunger inward, along with the tread scale shaft until the tread slot outer side 86 registers with the first tread thickness scale mark. When the router bit and collar described above this position will result in a 1½ inch thickness tread mortise plus additional cut for receiving adjusting shims when using the current apparatus. The template body is then adjusted such that the stringer cut edge SC registers with the desired tread length as marked on the tread length scale, the tread length being measured from the point along the tread slot outer side even with the riser slot outer wall 116.

If a mortise for a thinner tread is desired, the tread scale head is moved further out before adjusting the template body for the desired tread length as measured by tread length scale 84. An eighth inch change in tread thickness scale results in a ¼ inch difference in the tread thickness to be received by the mortise. A larger collar is then used on the router, in this case a 1 inch diameter collar.

The riser length is similarly set by adjusting the riser scale head 108 inward from its retracted position by pushing on riser scale plunger 112. The inner position of riser scale head 108 is set at ⅛ to allow for router collar thickness, the riser thickness being standard at ¾ inch as measured at slot junction 30, excess mortise being provided for final shimming. With the riser scale head in its extended position, the stringer cut edge SC is registered with the desired stringer height along the riser length scale while maintaining the stringer cut edge SC at the correct position on the extended tread length scale. The rise is measured from ⅛ inch below the tread slot outer side.

Once the correct run and rise are obtained, Tread registration tubular member 48 is moved along tread registration bar 42 until snug against stringer cut edge SC and riser registration tubular member 58 is moved along riser registration bar 52 until snug against stringer cut edge SC. The tread registration body set screw is tightened against tread registration bar 42 and the riser registration body set screw is tightened against riser registration bar 52 forming fixed registration points. The tread scale plunger is loosened, slid along shaft 79 and tightened against template body tread side 14. The threaded post of clamp assembly 24 is then rotated in "V"-slot 68 so as to be perpendicular to stringer rail edge SR and angle bracket 70 tightened against the rail edge SR by rotating wing nut 72 against clamping spring 74. Riser block arm 94 is rotated to a closed position and tread scale head and riser scale head pulled back into their receptacles to provide a smooth routing guide.

A router bit is first inserted into open end space 26a of tread slot 26 until the router guide surface rests on template body face 30. The router is then started and the tread receiving mortise cut by moving the router collar along against the inner edges of the tread groove and removing any interior excess. Then the riser block arm 94 is rotated to the full open position and secured by set screws so that its lower side may form a straight extension of riser slot outer wall 116. The router is than inserted into open end space 28b of riser slot 28 until the router guide surface rests on template body face 30. The router is then started and the riser mortise cut by moving the router collar along the inner edges of the riser groove 28 and riser block arm 94 and removing any excess. The clamp assembly is then loosened, riser scale head 108 extended, and the template moved to the left(as shown) until riser scale head 108 reaches the first corner of the previously cut tread mortise. The riser scale head 108 is retracted and the new tread and riser mortises are cut by the same procedure. This is repeated until the stringer is complete.

A second complimentary stringer may be cut in the same way by flipping over the template and allowing registration tubular members 48,58 to slide down to act as registration points and the clamp assembly tightened against the complimentary stringer and cutting a series of tread and riser mortises. When assembled, the treads and risers of the stairway will fit into the two complimentary stringers.

If it is desired to extend the mortises further into the stringer a lay line may be scribed parallel to the stringer cut edge SC, typically 1 to 2 inches inside the edge and tread and stringer length. Length measurements are then taken from the lay line rather than the stringer cut edge SC.

In the operation of the embodiment of the inventive template assembly 10 configured as in FIG. 3, an open stair cut is made. In this case, the riser block arm 94 is permanently secured in the closed position since no riser mortises are to be cut into the stringer S. The registration points are set as in the previous procedure to obtain the desired tread length. The riser registration point is set to obtain the desired angle of the tread relative to the riser. A rise height is then taken on the extended riser head length scale. Once a tread mortise is routed out, the clamp is loosened and the template moved to the left(as shown) until the extended riser head reaches the first corner of the tread mortise. A second tread mortise may then be routed out and the procedure repeated until the stringer. Again, a complimentary stringer may be routed out for the open stair by flipping over the template and following the same cutting procedures.

An open stair tread mortise may be extended further into the stringer by using a lay line as described above and placing a block in the tread slot near its open end so as to make a closed mortise in the stringer. It may be necessary to remove the block and make a mark along the lay line to which the riser is moved to cut the next tread mortise. The block keeps the router from cutting through to the stringer cut edge SC of the stringer S, thereby making a more attractive indoor exposed stairway.

Although the embodiment shown is useful for most stairways, a template of a different size may be constructed as desired for cutting mortises for larger or smaller stair steps.

The material for the body of the template, is preferably plastic such as HDPE, but may be aluminum or other appropriate material. The fittings are preferably made of an appropriate metal such as stainless steel.

It is to be understood that the present invention is not limited to the embodiments described above, but encompasses any and all embodiments within the scope of the following claims.

I claim:

1. A variable tread and rise router template for stair stringers comprising:
    a generally triangular, horizontally disposed body including opposite first and second planar faces to be laid against a stair stringer having a cut edge and a rail edge, said body defining an elongated tread slot and an elongated riser slots, wherein said generally triangular, horizontally disposed body further includes a tread side, a riser side and a base side, defining truncated corners therebetween, and wherein said tread slot and said riser slot each has an outer wall and respective remote ends and a common junction end, said tread slot and said riser slot meeting at a right angle at the junction end, the outer wall of said tread slot being substantially parallel and spaced from the tread side of said body and the outer wall of said riser slot being substantially parallel and spaced from the tread side of said body;
    run registration means for adjustably registering said tread slot with respect to the stair stringer cut edge enabling the tread length to be varied;
    rise registration means for adjustably registering said riser slot with respect to the stair stringer cut edge enabling the riser height to be varied;
    said run and rise registration means being flush with or below one face when the other face is laid on the stair stringer;
    a run scale assembly mounted on said body, said run scale assembly comprising:
        a run scale head;
        a run scale plunger; and
        a run scale shaft extending perpendicularly from said run scale head;
        said run scale plunger being movably secured alone said run scale shaft;

said body defining a transverse bore extending therethrough from said tread side to a point near the remote end of the outer wall of said tread slot and substantially perpendicular thereto;

said run scale shaft extending through the transverse bore;

said run scale head being located in extendable and retractable communication with said tread slot;

said run scale plunger being mounted on paid run scale shaft at a point spaced from the tread side of said body when said run scale head is in a retracted position; and a clamping assembly for securing said body to a stair stringer with said tread and riser registration means engaging the stair stringer cut edge.

2. The routing template of claim 1, wherein said clamping assembly includes a clamp pivotally secured to said template body to accommodate variation in adjustment of said run and said rise registration means, said clamping assembly being located generally opposite said run and said rise registration means for engaging the riser railed edge.

3. The routing template of claim 2, wherein said clamping assembly further comprises a clamping assembly pivot socket located in a pivot socket bore within said template body, a threaded post attached to said pivot socket and extending beyond said truncated corner of said template body, an angle bracket slidably mounted on said threaded post for engaging the stringer rail edge, and a wing nut threadedly mounted on said threaded post for tightening said angle bracket against said stringer rail edge, said treaded post being pivoted to accommodate variation in adjustment of said tread registration assembly and said riser registration assembly so as to maintain said angle bracket square to the stringer rail edge.

4. The routing template of claim 3, further comprising a clamping spring coaxial with said threaded post and located between said angle bracket and said wing nut for transferring tightening force from said wing nut to said angle bracket.

5. The routing template of claim 1, wherein each of said run and registration means includes:

registration slots defined in said body, said registration slots having respective opposing sides and located generally perpendicular to and overlapping said stringer cut edge when said routing template is positioned on said stringer for routing stringer mortises;

a registration bar extending the length of said respective registration slots;

a registration tubular member having opposing slots therein by which said tubular member is slidably mounted on said registration bar for vertical movement relative to said registration bar; and an assembly for securing said tubular member at a desired registration point along said registration bar;

said tubular member being guided in a substantially vertical disposition by the inner walls.

6. The routing template of claim 5, wherein said assembly for securing said tubular registration member at a desired registration point along said registration bar includes a cylindrical body defining a transverse bore therethrough at about its midpoint sized for sliding engagement with said registration bar, said cylindrical body defining at least one axially located threaded bore extending from an end thereof to said transverse bore, and a set screw extending inward within each said axially located treaded bore, said cylindrical body being coaxially located within said tubular member and slidably engaged therewith, whereby said tubular registration member is moved to a desired registration point, held in place by tightening said set screw against said registration bar while remaining free to slide by force of gravity vertically around said cylindrical body within the limits of said vertical limits of said groove, thereby forming a registration point below said template body regardless of which planar face is placed against said template body.

7. The router template of claim 1, wherein said run scale head is generally rectangular in shape having upper and lower faces coextensive with said template body upper and lower planar faces, and an inner face opening into said tread slot, said inner face having graduations therealong defining a run length scale measured from said slot junction.

8. The router template of claim 7, wherein said template body defines a recess for receiving said run scale head, the front face of said run scale head being even with said tread slot outer wall when in the retracted position.

9. The router template of claim 8, said upper face of said run scale head having graduations along an end thereof defining a tread thickness scale measure from said front face, said run scale head being extended into said tread slot according to said tread thickness scale registering with said tread slot outer wall.

10. The router template of claim 1, further comprising a closed stair tread slot wall insert extending between said slot junction and said tread slot remote end forming a tread slot inner wall, said tread slot inner wall sloping inward from said slot junction to said remote end.

11. The router template of claim 1, said tread slot extending to form a tread slot end past said slot junction, said template body further comprising a rounded end insert located in said tread slot end.

12. A variable tread and rise router template for stair stringers comprising:

a generally triangular, horizontally disposed template body including opposite first and second planar faces to be laid against a stair stringer having a cut edge and a rail edge, said body defining an elongated tread slot and an elongated riser slot, wherein said generally triangular, horizontally disposed body further includes a tread side, a riser side and a base side, defining truncated corners therebetween, and wherein said tread slot and said riser slot each has an outer wall and respective remote ends and a common junction end, said tread slot and said riser slot meeting at a right angle at the junction end, the outer wall of said tread slot being substantially parallel and spaced from the tread side of said body and the outer wall of said riser slot being substantially parallel and spaced from the riser side of said body;

run registration means for adjustably registering said tread slot with respect to the stair stringer cut edge enabling the tread length to be varied;

rise registration means for adjustably registering said riser slot with respect to the stair stringer cut edge enabling the riser height to be varied;

said run and rise registration means being flush with or below one face when the other face is laid on the stair stringer;

a rise scale assembly mounted on said template body, said rise scale assembly comprising:

a rise scale head;

a rise scale plunger; and a rise scale shaft extending perpendicularly from said rise scale head;

said rise scale plunger being secured along said rise scale shaft;

said body defining a transverse bore extending therethrough from said riser side to a point near the remote end of said riser slot outer wall and substantially perpendicular thereto;

said rise scale shaft extending through said transverse bore;

said rise scale head being located in extendable and retractable communication with said tread slot;

said plunger being mounted on said rise scale shaft at a point spaced from said template body riser side when said rise scale head is in a retracted position; and a clamping assembly for securing said body to a stair stringer with said tread and riser registration means engaging the stair stringer cut edge.

13. The router template of claim 12, wherein said rise scale head is generally rectangular in shape having upper and lower faces coextensive with said template body upper and lower planar faces, and an inner face opening into said riser slot, said inner face having graduations therealong defining arise length scale measured from said slot junction.

14. The router template of claim 13, wherein said template body defines a recess for receiving said rise scale head, the front face of said rise scale head being even with said tread slot outer wall when in the retracted position.

15. The router template of claim 14, said rise scale head being extendable a predetermined distance into said tread slot as determined by the spacing of said rise scale plunger from said riser template body side when said rise scale head is in a retracted position.

16. The router template of claim 12, further comprising a riser block arm located at said slot junction and having an upper side, a lower side, a pivot end and a remote end, said pivot end being mounted for rotation on said template body between an open position where said lower side serves as an extension of riser slot outer wall into said tread slot and a closed position blocking off said riser slot from said tread slot.

17. The router template of claim 12, further comprising an open stair tread slot wall insert extending between said slot junction and said tread slot remote end forming a tread slot inner wall, said tread slot inner wall being parallel with said tread slot outer wall.

18. The router template of claim 12, said tread slot extending to form a tread slot end past said slot junction, said template body further comprising a butt end insert located in said tread slot end.

* * * * *